United States Patent
Eves

[11] 3,956,884
[45] May 18, 1976

[54] GAS TURBINE ENGINE FUEL CONTROL SYSTEMS

[75] Inventor: Richard John Eves, Solihull, England

[73] Assignee: Lucas Industries Limited, Birmingham, England

[22] Filed: July 7, 1975

[21] Appl. No.: 593,299

[30] Foreign Application Priority Data
July 9, 1974 United Kingdom............... 30311/74

[52] U.S. Cl............................................. 60/39.28 R
[51] Int. Cl.² ............................................ F02C 9/04
[58] Field of Search.................. 60/39.28 R; 415/10, 415/13, 17; 290/40 A

[56] References Cited
UNITED STATES PATENTS

| | | | |
|---|---|---|---|
| 2,941,359 | 6/1960 | Miller et al. .................. | 60/39.28 R |
| 3,295,316 | 1/1967 | Beatrice et al. ................ | 60/39.28 R |
| 3,381,470 | 5/1968 | Hammerstein et al. ......... | 60/39.28 R |
| 3,488,948 | 1/1970 | Cornett et al. ................. | 60/39.28 R |
| 3,533,236 | 10/1970 | Cottington ..................... | 60/39.28 R |
| 3,606,754 | 9/1971 | White............................. | 60/39.28 R |
| 3,844,114 | 10/1974 | Nonnenmann et al. ........ | 60/39.28 R |

FOREIGN PATENTS OR APPLICATIONS

| | | | |
|---|---|---|---|
| 1,386,401 | 3/1975 | United Kingdom............ | 60/39.28 R |

*Primary Examiner*—Carlton R. Croyle
*Assistant Examiner*—Robert E. Garrett

[57] ABSTRACT

An electronic fuel control for a gas turbine engine comprises a manual control for setting the desired value of an engine parameter, an error amplifier connected to produce an error signal corresponding to the difference between the output of the control and an integrator, the output of the integrator controlling the supply of fuel to the engine. The error amplifier is connected to the integrator through a variable limiter, which applies a limit to the error in accordance with the difference between the integrator output and the actual value of the parameter. The limiter causes the error signal to go negative if this difference becomes too great.

2 Claims, 3 Drawing Figures

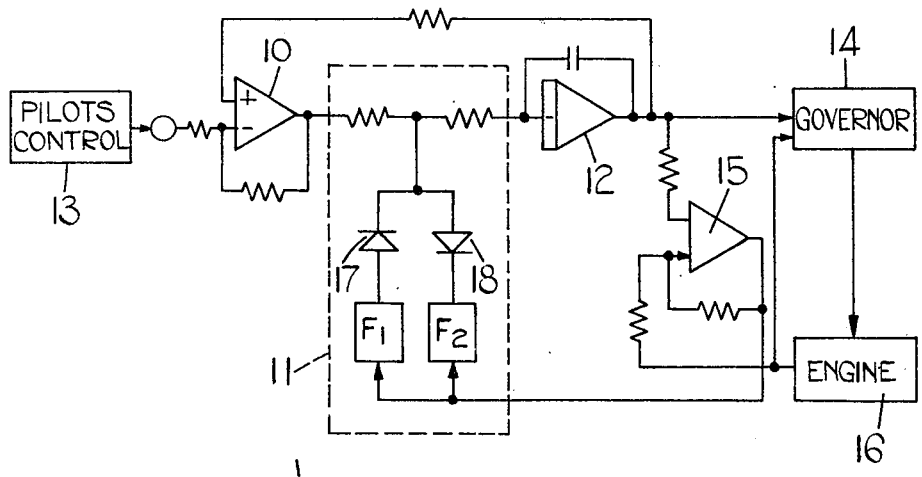
FIG.1.
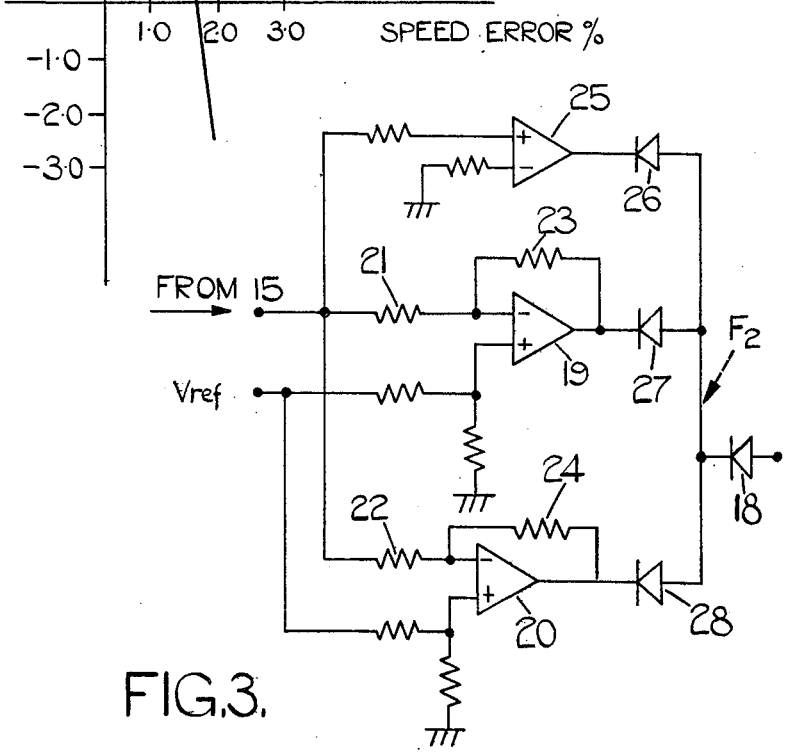
FIG.2.
FIG.3.

GAS TURBINE ENGINE FUEL CONTROL SYSTEMS

This invention relates to gas turbine engine fuel control systems of the kind comprising a speed governor and means for supplying the speed governor with a speed datum signal, such means including an acceleration control means whereby a limit is placed on the rate of increase of the datum speed signal in accordance with prevailing engine conditions.

Our British Patent Specification No. 946111 describes such a system in which the speed datum signal is arrived at in an electronic integrator circuit which integrates an error signal derived by comparing the desired speed with the actual speed with a limit placed on such error signal by a function generator supplied with temperature and pressure signals from transducers in the engine.

It has more recently been proposed (our British Patent Application No. 20027/73) to control the function generator which limits the error signal in terms of the difference between an actual engine speed signal and the speed datum signal. Analysis of such a system has, however, led to a belief that the system may be over-sensitive in the case of military aircraft where the fuel supply is suddenly reduced during gun firing. After firing the difference between the actual engine speed signal and the speed datum signal would be larger than would occur in normal acceleration and uncontrolled acceleration could result. Problems could also result on relighting an engine after an in-flight flame-out or when a substantial amount of power has been drawn from the engine for a time for operating auxiliary equipment, of the aircraft.

It is an object of the invention to provide a system of the kind specified in which the effects of these possible disadvantages are eliminated or at least reduced substantially.

In a system of the kind specified and in accordance with the invention the means for supplying the speed governor with a speed datum signal comprises an integrator, a first difference amplifier comparing the output of the integrator with a demand signal corresponding to the required value of an engine parameter, a limiter circuit connecting the output terminal of the first difference amplifier to the input terminal of the integrator and a second difference amplifier for comparing the output of the integrator with a signal corresponding to the actual value of said engine parameter, said limiter circuit being controlled by the output of the second difference amplifier to decrease the limit applied to the output of the first difference amplifier as the output of the second difference amplifier increases and to reduce the input to the integrator to a negative value (to decrease the output of the integrator) when the output of the second difference amplifier exceeds a predetermined value.

An example of the invention is shown in the accompanying drawings in which:

FIG. 1 is a block diagram showing the system,
FIG. 2 is a graph illustrating the output of a function generator included in the system and
FIG. 3 is a circuit diagram of the function generator.

The system shown includes a first difference amplifier 10 the output terminal of which is connected to an input terminal of a limiter circuit 11 having an output terminal connected to the input terminal of an integrator 12. One input to the difference amplifier 10 is connected to a pilots control 13 which supplies a speed demand signal to the amplifier 10. The other input signal to the amplifier 10 is derived from the output of the integrator 12. In equilibrium the output of the integrator 12 will be equal to the speed demand signal so that the output of the amplifier 10 is zero.

The integrator 12 supplies a speed datum signal to a fuel control 14 which includes a governor which causes the rate of fuel flow to the engine 16 to vary to make the engine speed take a value corresponding to the speed datum signal. The speed datum signal is also applied to a second difference amplifier 15 which is used to supply a control signal to the limiter circuit 11. The amplifier 15 compares the speed datum signal with an actual speed signal from a transducer in the engine 16.

The limiter circuit 11 includes two function generators $F_1$ and $F_2$ providing limit signals for deceleration and acceleration respectively. Each function generator has its output terminal connected to a resistance network connecting the amplifier 10 to the integrator 12 by a diode 17, 18. The diode 17 is connected so that the input to the integrator 12 cannot be more negative than the signal generated by the function generator $F_1$ and the diode 18 is oppositely connected so that the input to the integrator cannot exceed the output signal of generator $F_2$.

The generator $F_1$ does not concern us here, but the characteristic of the generator $F_2$ is shown in FIG. 2. In this graph the abscissa represents the error signal produced by amplifier 15 as a percentage of the maximum speed datum signal and the ordinate, the maximum permitted rate of increase of the output of the integrator 12.

Thus, provided the error signal is always zero, i.e. provided the actual speed signal can keep pace with the speed datum signal then the maximum ramp rate is 3% per second (where the percentage is relative to the maximum speed datum signal). As the speed error increases the ramp rate decreases, at first at a relatively low rate and subsequently at a high rate so that for an error in excess of 1.6% the ramp rate becomes negative.

FIG. 3 shows a possible circuit for the function generator $F_2$. The circuit shown includes two operational amplifiers 19, 20 connected as difference amplifiers with the output terminal of the difference amplifier 15 connected by resistors 21, 22 to the invert input terminals of the amplifiers 19, 20 and feedback resistors 23, 24 chosen to define the sloper of the shallow and steep parts of the characteristic curve of FIG. 2. A reference voltage V ref is connected to a network of resistors applying different bias voltages to the non-invert input terminals of the two amplifiers 19, 20. The circuit also includes a voltage comparator 25 for producing the sharp cut-off of the characteristic at zero error signal. The comparator 25 and the amplifiers 19, 20 have their output terminals connected via diodes 26, 27, 28 to the anode of diode 18 (which may if required be omitted).

In use, therefore, after a step increase in the speed demand signal the ramp rate will initially be 3% but will fall as the speed error increases. For acceleration rates lower than the limit set by the function generator $F_2$ (i.e. when acceleration is governed by slow progressive movement of the speed demand) control of the ramp rate will be assumed directly by the amplifier 10.

In the event that the error between the speed datum signal and the actual speed signal exceeds 1.6% the generator $F_2$ takes control even during steady running conditions and causes the speed datum signal to be reduced until the cause of the excessive error is removed after which normal controlled acceleration back to the original speed takes place.

I claim:

1. A gas turbine engine fuel control system of the kind comprising a speed governor and means for supplying to the speed governor a speed datum signal, such means including an acceleration control means whereby a limit is placed on the rate of increase of the datum speed signal in accordance with prevailing engine conditions, in which the means for supplying the speed governor with a speed datum signal comprises an integrator, a first difference amplifier comparing the output of the integrator with a demand signal corresponding to the required value of an engine parameter, a limiter circuit connecting the output terminal of the first difference amplifier to the input terminal of the integrator and a second difference amplifier for comparing the output of the integrator with a signal corresponding to the actual value of said engine parameter, said limiter circuit being controlled by the output of the second difference amplifier to decrease the limit applied to the output of the first difference amplifier as the output of the second difference amplifier increases and to reduce the input to the integrator to a negative value (to decrease the output of the integrator) when the output of the second difference amplifier exceeds a predetermined value.

2. A system as claimed in claim 1 in which the limiter circuit includes a function generator controlled by the output of the second difference amplifier and providing an output signal which has a maximum value when the output of the second difference amplifier is zero, which decreases relatively slowly with increasing values of the output of the second differene amplifier for low values of that output, but decreases more sharply for higher values of that output.

* * * * *